United States Patent [19]

Dutkiewicz

[11] 4,299,598

[45] Nov. 10, 1981

[54] PANEL GAS FILTER FOR LIMESTONE DUST

[76] Inventor: Ryszard K. Dutkiewicz, 2 Tudor City Place, 42nd St., New York, N.Y. 10017

[21] Appl. No.: 781,189

[22] Filed: Mar. 25, 1977

[30] Foreign Application Priority Data

Mar. 24, 1976 [ZA] South Africa ...................... 76/1808

[51] Int. Cl.² ............................................. B01D 46/32
[52] U.S. Cl. .......................................... 55/99; 55/474; 55/479; 71/60
[58] Field of Search .................. 55/77, 79, 96, 98, 99, 55/282, 302, 350, 474, 479, 516–519; 34/174, 167, 168; 23/288 G; 201/34; 71/59, 60, 63

[56] References Cited

U.S. PATENT DOCUMENTS

| 789,807 | 5/1905 | Holl ....................................... 34/167 |
| 1,482,812 | 2/1924 | Roberts ................................. 34/174 |
| 3,296,775 | 1/1967 | Squires ................................... 55/96 |
| 3,982,326 | 9/1976 | Squires ................................... 55/96 |
| 4,004,885 | 1/1977 | Groenendaal et al. ................. 55/99 |

FOREIGN PATENT DOCUMENTS

| 183921 | 3/1904 | Fed. Rep. of Germany ........ 55/516 |
| 543747 | 6/1922 | France .................................. 55/350 |
| 216675 | 6/1924 | United Kingdom.................. 55/479 |

Primary Examiner—Bernard Nozick

[57] ABSTRACT

A plate bed filter is operated by allowing the filter medium, i.e. granules to pass continually from top to bottom. The filters may be placed in pairs in a horizontal duct with blanking walls to guide all the gas being filtered to pass therethrough. Alternatively the filter may be located in a vertical duct.

3 Claims, 4 Drawing Figures

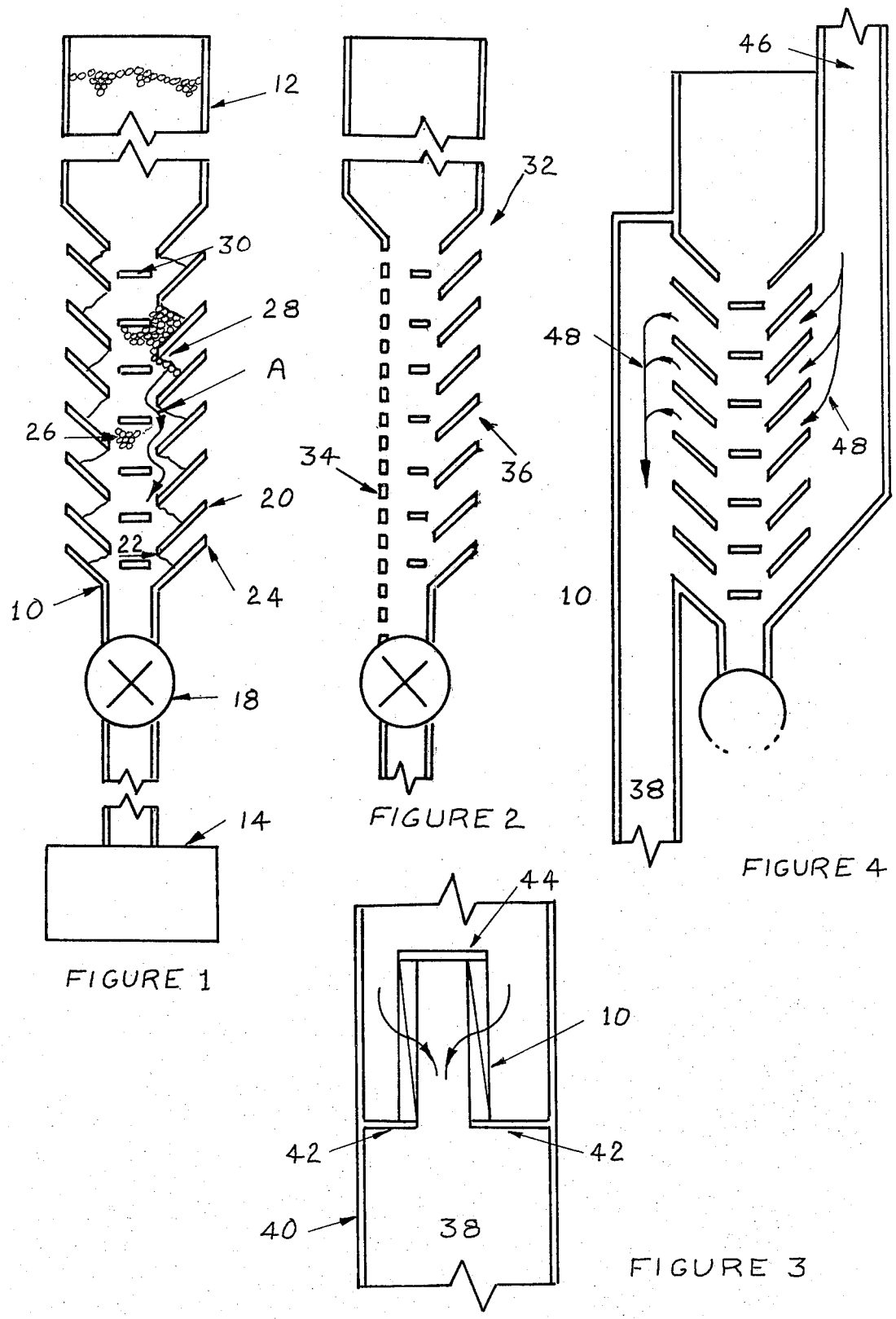

PANEL GAS FILTER FOR LIMESTONE DUST

This invention relates to gas filters and in particular filters for gas which entrains solid particulate matter.

The invention is concerned with a panel bed filter comprising a container for containing granular filter medium and having a pair of sides through which the gas can pass, at least one of the sides being constituted by a set of plates which are inclined inwardly at their lower ends and which are arranged with the upper edges of the lower plates overlapping and being spaced from the lower edges of the upper plates, the filter element further comprising a hopper above the container and a receptacle therebelow.

A typical panel bed filter is illustrated in British Patent Specification No. 1 416 053. In this specification the granular filter medium is exchanged by blow back through the container. In other known bed filters the filter medium is changed by draining and refilling the container.

I have found that the bulk of the filtration takes place on the exposed surface of the medium between the plates. Accordingly I provide flow control means controlling the movement of the filter medium from the hopper to and through the container and hence into the receptacle, so that there is in use a continuous flow of filter medium through the container. Thus the exposed surface of the filter medium will be continually changing and the operation of the filter will be much more efficient. Further the filter will be continuously operable without the perodic drain and refilling or the periodic blow back and refill as described in British Patent specification No. 1 414 053.

Cross plates are preferably provided within the container to support the weight of some of the filter medium therein and to improve the circulation of the filter medium.

Preferably the filter element is provided in a duct and is arranged so that all gas flowing through the duct will pass through the sides of the filter element.

According to another aspect of the invention there is provided a method of operating a panel bed filter comprising continuously passing filter medium through the panel bed filter whilst passing gas to be filtered therethrough.

The invention can with advantage be used in granulated fertiliser manufacturing plant where the air that is normally discharged to atmosphere is laden with fertiliser dust. By using the fertiliser granules as the filtering matter, the air discharged will be cleaned and the dust removed therefrom will form a coating for the granules. Thus both problems of environmental pollution and losses of fertiliser dust are eliminated.

A number of embodiments of the invention will now be described by way of example with reference to the accompanying diagrammatic drawings.

In the drawings:

FIG. 1 is a section through a filter of the invention,

FIG. 2 is a similar section through a modified filter of the invention,

FIG. 3 is a sectional plan through a filtering unit of the invention, and

FIG. 4 is a transverse section through another filtering unit of the invention.

Referring now to FIG. 1, the plate bed gas filter 8 of the invention comprises a solids container 10, a hopper 12 therebelow, and a receptacle 14 below. A feeder valve 18 is located below the container 10 to control flow through the container 11 into the receptacle 14.

The solids container 10 comprises two sets of inclined outer plates 20 arranged in pairs. The plates 20 extend horizontally and the plates of each pair converge towards their lower edges 22. The lower edges 22 of one pair of plates 20 are located below and spaced from the upper edges 24 of the pair immediately therebelow. Thus a gas passage is formed between adjacent plates of each set.

Horizontal plates 30 are provided internally of the container. These plates 30 are slightly less wide than the spacing between the lower edges of the plates 20. They, the horizontal plates 30, support the weight of the granules above them so that there is no undue pressure on the feeder valve 18. Further these plates improve the movement of the granules through the container 10 as will be described.

The solids container 10 has granules 26 therein. These granules fill the space between the sets of plates and enter into the gas passages. In addition these granules build up in the spaces between the outside of the lower portions of the plates and the inside and upper portions of the plates immediately therebelow. The amount of this overlap is designed to ensure that the material does not spill over the upper edges of the lower plates.

The settings of the feeder valve 18 is such that the granules pass continuously through the solids container. The speed of movement is such that the upper layers (indicated diagrammatically at 28) of granules at the entrance to the air passages are continuously changing.

The preferred direction of movement is preferably as shown by arrows A in FIG. 1.

Referring now to FIG. 2 there is shown a filter 32 where the granules 26 are large, as for instance in a fertilizer works. In this filter 32 a wire mesh or gauze 34 is provided to define the downstream side of the container 36 in place of the downstream set of plates 20. This decreases the pressure drop through the filter 32.

The arrangements above described are single pass arrangements but if desired, a conduit with a suitable moving means therein may be provided to ensure that the granules 26 pass through the container a number of times.

A preferred way of arranging the filters 10 is shown in FIG. 3. A pair of filters is arranged parallel to one another in a horizontal gas passage 38. The filters 10 extend the entire height of the passage 38 and are equispaced from each other and the walls 40 of the passage 38. Blanking walls 42 extend from the downstream ends of the filters to the passage walls 40. A further blanking wall 44 spans the upstream end of the filters 10. Thus, gas passing along the gas passage must pass through the filters 10.

In a modified arrangement as shwon in FIG. 4 a filter 10 is arranged in a vertical gas duct 46 and the gas flow passes sideways through the filter as shown by arrows 48.

The sizes, positions and angles of plates 20 and 30 are determined for each comnbination of filtering medium, filtered solids and fluid velocity.

The size of the filtering medium depends on the size of the solids which have to be filtered out of the fluid stream. For filtration of fine particles a filtering medium having granular size of approximately 0,5mm is sued, whilst for larger particles such as those in fertilizer works, the size could be 2mm. The efficiency of filtration is a function of the ratio of solid particles size to granular size. For instance when filtering limestone dust with a size range between 0,0005mm and 0,005mm using a filter medium comrpising limestone ammonium nitrite granules having a size between 0,6mm and 1,0mm may be used. This arrangement gives an efficiency of about 70%. If the filtering medium size was increased to 2mm the efficiency would fall to 50%.

The pressure drop through the filter is a function of gas velocity and filtering medium particle size. For instance, at ten meters per minute gas velocity the pressure drop varied from 8mm of water with granule size of about 2mm to about 20mm of water for granules of approximately 1mm diameter.

I have found that the filters as above described have a very high efficiency whilst the pressure drop through the filters is minimal. This high efficiency is due to the fact that the upper granule layers 28 where the bulk of the filtration takes place is continually changing.

The invention is not limited to the precise constructional details hereinbefore described and illustrated in the drawings.

I claim:

1. A method of operating a panel bed filter comprising continuously passing a filter medium consisting of limestone ammonium nitrate granules through the panel bed filter so that the surface of the filter medium exposed between the plates is continuously changing and passing gas containing limestone dust through the panel bed filter.

2. A method as claimed in claim 1 in which the granule size is between 0,5mm and 2mm.

3. A method as claimed in claim 1 in which the gas entrains limestone dust with a size range between 0,0005mm and 0,005mm and in which and in which the granule size is between 0,6mm and 1,0mm.

* * * * *